(12) United States Patent
Kim et al.

(10) Patent No.: US 7,054,884 B2
(45) Date of Patent: May 30, 2006

(54) METHOD, APPARATUS AND RECORDING MEDIUM FOR RECORDING TIME INFORMATION FOR DIGITAL DATA STREAMS

(75) Inventors: Byung-Jin Kim, Kyunggi-do (KR); Kang-Soo Seo, Kyunggi-do (KR); Jea-Yong Yoo, Seoul (KR); Ki Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 10/766,858

(22) Filed: Jan. 30, 2004

(65) Prior Publication Data

US 2004/0186822 A1    Sep. 23, 2004

Related U.S. Application Data

(63) Continuation of application No. 09/500,488, filed on Feb. 9, 2000, now Pat. No. 6,789,072.

(30) Foreign Application Priority Data

Feb. 9, 1999  (KR) ........... 10-1999-0004467
Jan. 7, 2000  (KR) ........... 10-2000-0000715

(51) Int. Cl.
    *G06F 17/00*   (2006.01)

(52) U.S. Cl. ............................ 707/102; 707/104.1
(58) Field of Classification Search .............. 707/3, 707/102, 104.1; 386/85; 360/50
    See application file for complete search history.

(56) References Cited

U.S. PATENT DOCUMENTS

| 5,666,365 | A |   | 9/1997  | Kostreski |
|-----------|---|---|---------|-----------|
| 5,918,223 | A | * | 6/1999  | Blum et al. ................. 707/1 |
| 6,009,226 | A |   | 12/1999 | Tsuji et al. |
| 6,119,213 | A |   | 9/2000  | Robbins |
| 6,138,147 | A | * | 10/2000 | Weaver et al. ............. 709/206 |
| 6,233,389 | B1 |   | 5/2001  | Barton et al. |
| 6,317,440 | B1 |   | 11/2001 | Sung |
| 6,321,252 | B1 |   | 11/2001 | Bhola et al. |
| 6,356,706 | B1 |   | 3/2002  | Ando et al. |
| 6,456,783 | B1 |   | 9/2002  | Ando et al. |
| 6,470,135 | B1 |   | 10/2002 | Kim et al. |
| 6,553,086 | B1 |   | 4/2003  | Yoo et al. |
| 6,675,174 | B1 | * | 1/2004  | Bolle et al. ................. 707/104.1 |
| 2005/0065912 | A1 | * | 3/2005 | Cafrelli et al. ............... 707/3 |

OTHER PUBLICATIONS

Der MPEG-2-Standard, U. Riemann, Fernseh-Und Kino-Technik, 48, Jahrgang Nr. Oct. 1994, pp. 545, 548-550 and 553 (with English summary).

* cited by examiner

Primary Examiner—Jean R. Homere
Assistant Examiner—Susan Rayyan
(74) Attorney, Agent, or Firm—Birch, Stewart, Kolasch & Birch, LLP

(57) ABSTRACT

A method and apparatus for recording time information for received digital data streams are provided. The method includes recording first time information and second time information on a recording medium. The first time information is part of management data for managing presentation data and the second time information is time information of the presentation data. The format of the first time information coincides with the format of the second time information.

29 Claims, 9 Drawing Sheets

| PAT_base [ 38 ~ 31 ] | |
|---|---|
| PAT_base [ 30 ~ 23 ] | |
| PAT_base [ 22 ~ 15 ] | |
| PAT_base [ 14 ~ 7 ] | |
| PAT_base [ 6 ~ 0 ] | PAT_ext [ 8 ] |
| PAT_ext [ 7 ~ 0 ] | |

PAT_base : 90 KHz unit , PAT_ext : 27 MHz unit ( 0 ~ 299 )

| PAT_base [ 22 ~ 15 ] | |
|---|---|
| PAT_base [ 14 ~ 7 ] | |
| PAT_base [ 6 ~ 0 ] | PAT_ext [ 8 ] |
| PAT_ext [ 7 ~ 0 ] | |

PAT_base : 90 KHz unit , PAT_ext : 27 MHz unit ( 0 ~ 299 )

| SOB_GI | | |
|---|---|---|
| SOBU_SZ | MINIMUM MAPPING UNIT SIZE | 2 BYTES |
| MTU_SHFT | MAPPING TIME UNIT SHIFT | 1 BYTE |
| RESERVED | RESERVED | 1 BYTE |
| MAPL_ENT_NS | NUMBER OF MAPPING LIST ENTRIES | 4 BYTES |
| S_S_APAT | STREAM START APAT | 8 BYTES |
| S_E_APAT | STREAM END APAT | 8 BYTES |

(a)

| INCREMENTAL APAT | | |
|---|---|---|
| IAPAT | INCREMENTAL APAT | 2 BYTES |

(b)

*Conventional Art*

PAT_base : 90 KHz unit , PAT_ext : 27 MHz unit ( 0 ~ 299 )

PAT_base : 90 KHz unit , PAT_ext : 27 MHz unit ( 0 ~ 299 )

METHOD, APPARATUS AND RECORDING MEDIUM FOR RECORDING TIME INFORMATION FOR DIGITAL DATA STREAMS

CROSS-REFERENCE

The present application is a continuation of U.S. patent application Ser. No. 09/500,488 filed on Feb. 9, 2000 (now U.S. Pat. No. 6,789.072 B1, issued Sep. 7, 2004) for which priority is claimed under 35 U.S.C. §120; and the present application claims priority of Patent Application No. 1999-04467 filed in Republic of Korea on Feb. 9, 1999 and Patent Application No. 2000-00715 filed in Republic of Korea on Jan. 7, 2000, under 35 U.S.C. §119. The entire contents of each of these applications are herein fully incorporated by reference.

BACKGROUND OF THE INVENTION

1. Field of the Invention

The present invention relates to a method and apparatus for creating and recording time information for searching digital data streams to be recorded on a recording medium and a method and apparatus for searching for requested data using the created time information.

2. Description of the Related Art

In the conventional analog television broadcast, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcast industry also moves towards the digital broadcast.

The digital broadcast offers several advantages that its analog counterpart cannot provide. For example, the digital broadcast is capable of providing services with far more improved video/audio quality, transmitting several different programs within a fixed bandwidth, and offering enhanced compatibility with digital communication media or digital storage media.

In the digital broadcast, a plurality of programs encoded based upon the MPEG format are multiplexed into a single transport stream before transmitted. The transmitted transport stream is received by a set top box at the receiver and demultiplexed into original programs. If a program is chosen from among the demultiplexed programs, the chosen program is decoded by a decoder in the set top box and original audio and video signals are retrieved. The retrieved audio and video signals can be presented by an A/V output apparatus such as a TV.

It is also possible to record the received digital broadcast signals on a storage medium instead of directly outputting the received broadcast signals to A/V output devices. The stored digital broadcast signals can be edited and retrieved afterwards. For example, a digital data stream received by the set top box can be transmitted to a streamer such as a digital video disk (DVD) recording apparatus through communication interfaces like an IEEE-1394 serial bus and stored on a recording medium by the streamer. The recorded digital data stream can be edited and transmitted back to the set top box so that the digital audio and video data can be presented.

When recording the digital data stream of a single program on a recording medium in a streamer, the basic recording unit is a stream object (SOB) comprising a series of stream object units (SOBUs). To record received digital data streams on a recording medium and to reproduce the recorded data afterwards, it is necessary to explore how to group and record stream objects (SOBs) and stream object units (SOBUs) and how to create search information for managing and searching for the recorded stream objects (SOBS) and stream object units (SOBUs). Also, it is required to investigate how to search a specific data stream corresponding to a search time requested by a user.

A conventional method for recording digital data streams and creating and recording navigation information will now be explained with reference to the accompanying drawings.

FIG. 1 depicts a block diagram of an apparatus in which the conventional method for creating and recording the navigation information for recorded digital data streams can be employed. FIG. 2 depicts the process of recording digital data streams and creating the navigation information in the system shown in FIG. 1. The system comprises a set top box 100, a communication interface (IEEE-1394), and a streamer 200. The set top box 100 receives transport streams encoded by system encoders and broadcast by a plurality of broadcast stations and demultiplexes the received transport streams. After a decoder 120 decodes the transport stream of a program tuned by a tuning unit 110, a control unit 140 outputs the decoded transport stream to an A/V output apparatus or to the streamer 200 through the IEEE-1394 communication interface 130 and 210 so that the transmitted program can be recorded on a recording medium 230 by the streamer 200, depending upon a user's choice. When requested by a user, the streamer 200 retrieves the recorded program and transmits the retrieved program through the IEEE-1394 communication interface back to the set top box 100. In the set top box 100, the received program is decoded by the decoder 120 and then outputted to an A/V output apparatus so that the recorded program can be presented.

A control unit 250 of the streamer 200 controls a stream recording unit 220 to record the data stream transmitted from the set top box 100 on the recording medium 230, as shown in FIG. 2. The received data stream composed of transport stream packets is recorded on the recording medium along with the packet arrival time (PAT) of each transport stream packet. The transport stream packets with packet arrival times are organized in sectors on the recording medium, with each sector having a predetermined size. A predetermined number of sectors, for example 32 sectors, are grouped into a stream object unit (SOBU). If the recording process is stopped or suspended by a user, the recorded stream object units (SOBUs) are grouped into a stream object (SOB). Additionally, navigation data such as the stream start application packet arrival time (S_S_APAT) and incremental application packet arrival time (IAPAT) for managing and searching for the stream object (SOB) and stream object units (SOBUs) is recorded together with the transport stream packets on the recording medium.

FIG. 3 shows the way the received digital data stream is recorded on the recording medium 230. An application packet and its packet arrival time (PAT or time stamp) constitute a transport stream packet (TSP). A plurality of transport stream packets (TSPs) and header information are organized into a sector and a predetermined number of sectors, for example 32 sectors, constitute a stream object unit (SOBU). A series of stream object units (SOBUs) constitutes a stream object (SOB). Meanwhile, the stream object information (SOBI), which is the navigation data for managing and searching the recorded stream object (SOB), comprises stream object general information (SOB_GI) and a mapping list (MAPL) for managing stream object units (SOBUs) contained in the stream object (SOB), as shown in FIGS. 4 and 5. The stream object general information (SOB_GI) includes the stream start application packet arrival time (S_S_APAT) indicative of the start time of the associated stream object (SOB). As shown in FIG. 2, the incremental application packet arrival time (IAPAT), which is a count value counted at constant time intervals (x) between two consecutive stream object units (SOBUs), is included in the mapping list (MAPL) and used as information for searching for the associated stream object units (SOBUs).

The stream start application packet arrival time (S_S_A-PAT) contained in the stream object general information (SOB_GI) is recorded as a 6-byte packet arrival time (PAT) comprising a 9-bit packet arrival time extension (PAT_ext) and a 39-bit packet arrival time base (PAT_base), as shown in FIG. 6(*a*). The packet arrival time extension (PAT_ext) is a modulo-300 counter that is incremented at a rate of 27 MHz, whereas the packet arrival time base (PAT_base) is incremented at a rate of 90 kHz. Unlike the stream start application packet arrival time (S_S_APAT), the time stamp recorded along with the application packet shown in FIG. 3 is recorded as a 4-byte packet arrival time (PAT) as shown in FIG. 6(*b*) that is incremented at a rate of 27 MHz and thus can represent from 0 s up to 159 s (=$2^{32}/27$ MHz). As discussed above, the PAT of the transport stream packet as shown in FIG. 6(*b*) is a time stamp recorded along with an application packet, and is part of a SOB as shown in FIG. 3 where the SOB is part of user data (actual presentation data) recorded on the recording medium 230.

The method for searching for a transport stream packet corresponding to requested search time using the navigation and time information regarding the stream object (SOB), stream object units (SOBUs) will be explained in detail with reference to an example.

Suppose that the position (s) of a transport stream packet corresponding to the search time (ST) requested by a user is to be searched for, as shown in FIG. 2. First, the stream start application packet arrival time (S_S_APAT) contained in the stream object general information (SOB_GI) of each stream object (SOB) is compared with the requested search time (ST) and a stream start application packet arrival time (S_S_APAT) that is closest to but does not exceed the request search time (ST) is detected. Referring to the mapping list (MAPL) of the stream object SOB #1 containing the detected stream start application packet arrival time (S_S_APAT), the incremental application packet arrival time (IAPAT 1~4) contained in the mapping list (MAPL) are summed up. The sum value is multiplied by the unit time (x) and added to the detected stream start application packet arrival time ($S_{13}$ S_APAT). The procedure is repeated until the calculated value (S_S_APAT+x×ΣIAPAT) approaches the requested search time (ST) without exceeding it. In FIG. 2, the summation and multiplication is repeated to include IAPAT 4 because the calculated value exceeds the search time (ST) if the calculation continues to IAPAT5. Then, the entry in the mapping list (MAPL) corresponding to the calculated time (S_S_APAT+x×ΣIAPAT) is located and the index of the entry is multiplied by the number of sectors constituting a stream object unit (for example, 32 sectors) to locate the desired stream object unit SOBU 5.

From the start position A' of the searched stream object SOBU 5, the 4-byte packet arrival time (PAT), which is the time stamp of the transport stream packet, is detected. Recall that the stream start application packet arrival time (S_S_A-PAT) and the packet arrival time (PAT) of a transport stream packet have different formats and therefore the two values cannot be directly compared. For this reason, the difference between the detected packet arrival time (PAT) and the packet arrival time of the first transport stream packet of the stream object unit SOBU 5 is compared with the difference between the requested search time (ST) and the calculated value (S_S_APAT+x×ΣIAPAT) for fine search of the transport stream packet corresponding to the requested search time (ST).

The position A searched based upon the time information (S_S_APAT+x×ΣIAPAT) calculated using the incremental application packet arrival times (IAPATs), however, does not coincide with the actual start position A' of the stream object unit SOBU 5, as shown in FIG. 2. Therefore, the offset between the transport stream packet position A detected by the fine search operation and the actual position A' results in a delay in the search operation.

As a result, additional information indicative of the offset value between A' and A (Offset_SZ in FIG. 2) is necessary for precisely searching for the position (s) of the transport stream packet corresponding to the requested search time (ST). It is not desirable, however, to add the additional information to every stream object unit (SOBU), which dramatically lowers the recording efficiency of the recording medium.

SUMMARY OF THE INVENTION

It is an object of the present invention to provide a recording medium, a method and an apparatus for recording time information associated with digital data streams, which overcome the limitations and disadvantages of the related art.

It is another object of the present invention to provide a method and apparatus for creating search information for recorded digital data streams and a method and apparatus for searching digital data streams using the search information.

According to an aspect of the present invention, the time information for management and search of recorded digital data streams has the same time base as the time information used in navigation data for digital data streams and thus no information on the position offset is required. The overflow of the packet arrival time due to insufficient length of the packet arrival time data is detected and correction of time data is performed to prevent search error resulting from the overflow.

According to an aspect of the present invention, there is provided a method of recording time information associated with digital data streams, the method comprising the steps of: (a) recording first time information on a recording medium, the first time information being part of management data for managing presentation data; and (b) recording second time information on the recording medium, the second time information being time information of the presentation data, wherein a format of the first time information coincides with a format of the second time information.

According to an aspect of the present invention, there is provided an apparatus for recording time information associated with digital data streams, the apparatus comprising a recording unit for recording first time information and second time information on a recording medium, the first time information being part of management data for managing presentation data, the second time information being time information of the presentation data, wherein a format of the first time information coincides with a format of the second time information.

According to an aspect of the present invention, there is provided a recording medium for recording time information associated with digital data streams, the recording medium comprising: a recording layer; first time information stored on the recording layer, the first time information being part of management data for managing presentation data; and second time information stored on the recording layer, the second time information being time information of the presentation data, wherein a format of the first time information coincides with a format of the second time information.

These and other objects of the present application will become more readily apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 6 is a table showing the general time information for a recorded data stream, wherein

FIG. 7 is a table showing the time information for a recorded data stream according to an embodiment of the present invention, wherein

DETAILED DESCRIPTION OF THE PREFERRED EMBODIMENTS

Figure 1:
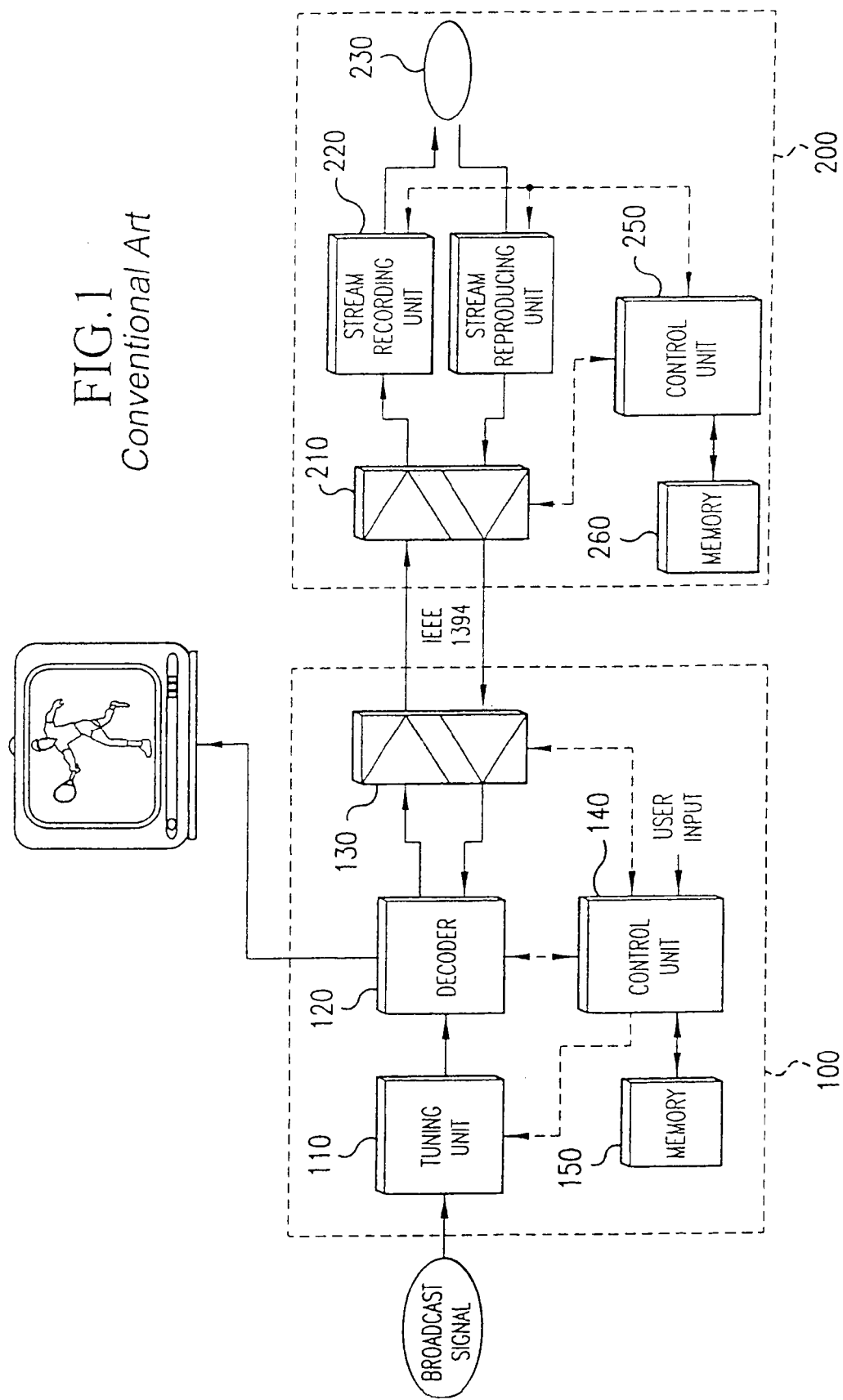
FIG. 1 is a block diagram of an apparatus in which a general method for creating and recording the navigation information for digital data streams and for searching recorded digital data streams using the navigation information can be employed.

In order that the invention may be fully understood, preferred embodiments thereof will now be described with reference to the accompanying drawings. It is understood that the methods of the present invention can be implemented in the apparatus of FIG. 1 or other apparatuses or systems. For the sake of easy understanding, the present invention will be discussed referring to the elements of FIG. 1.

Figure 7A:
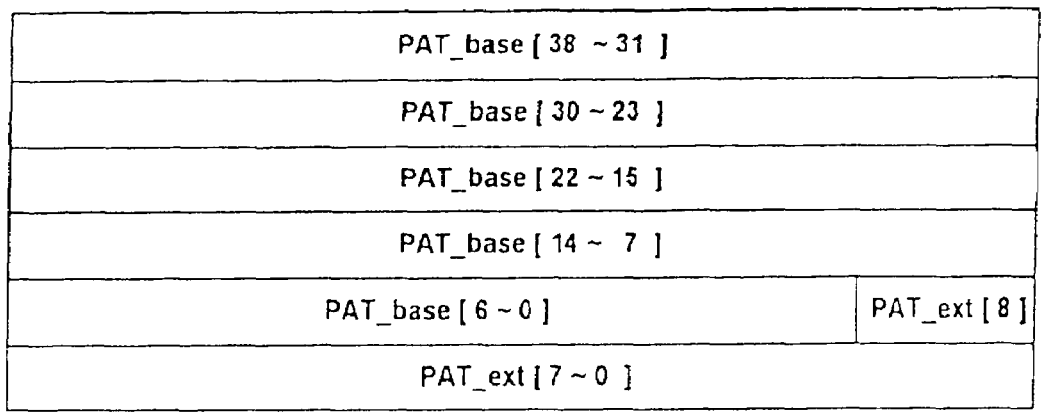
FIG. 7(a) shows 6-byte stream start application packet arrival time (S_S_APAT) contained in a stream object general information (SOB_GI) and FIG. 7(b) shows 4-byte packet arrival time (PAT) which is time stamp recorded with an application packet.
Figure 7B:
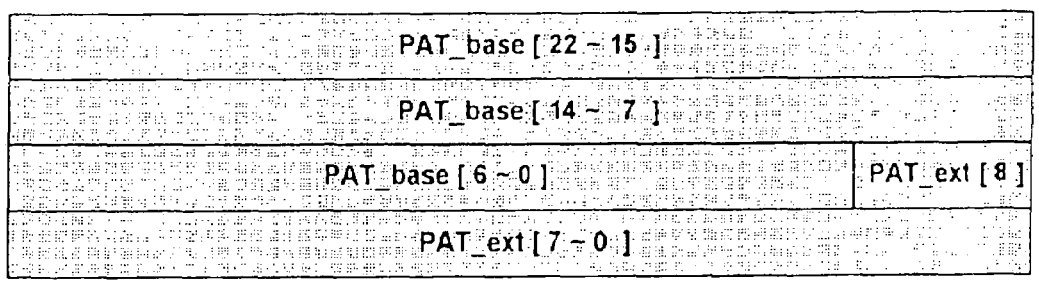
Figure 8:
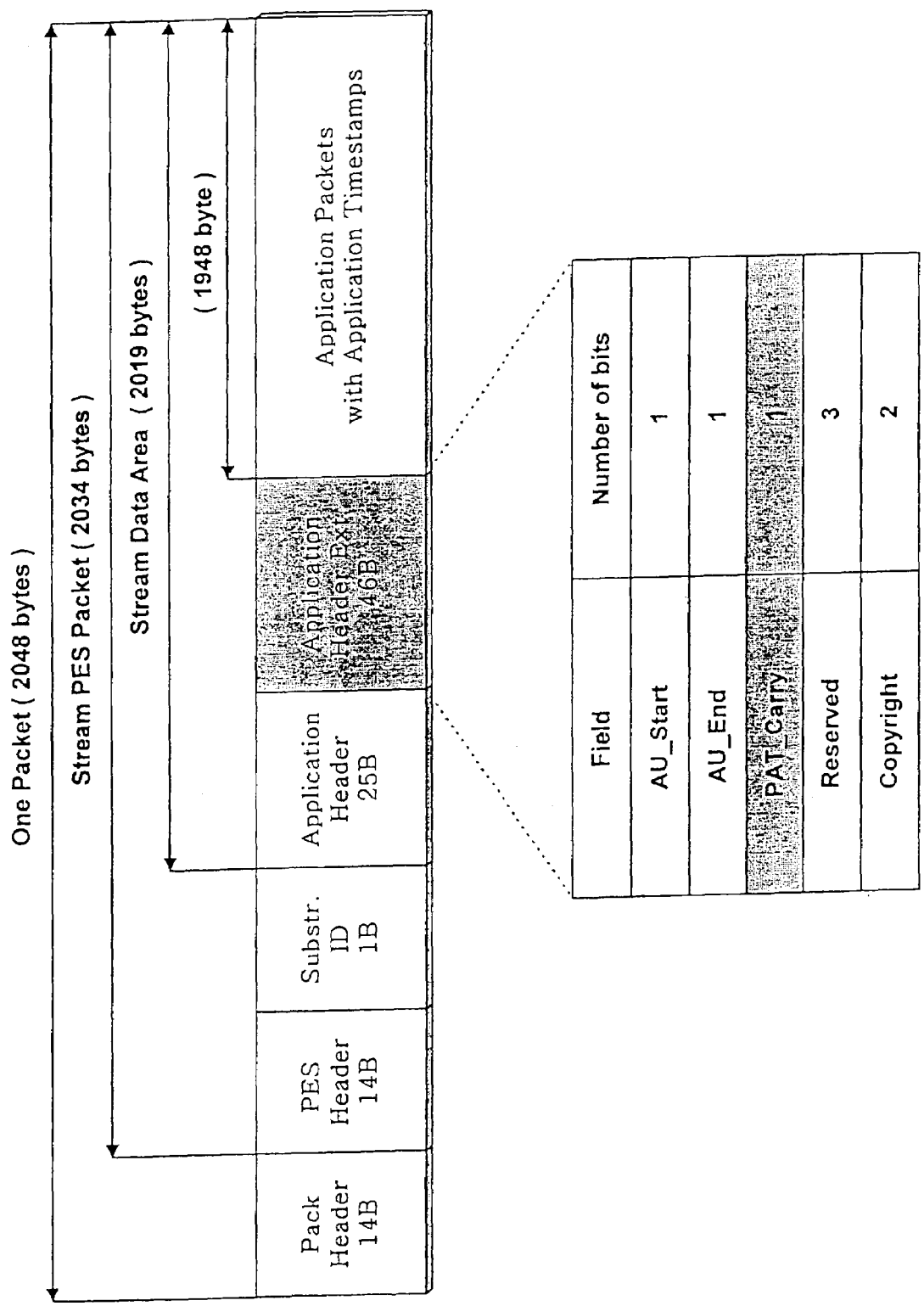
FIG. 8 is a pictorial representation of the reset indication information according to an embodiment of the present invention.

FIGS. 7 and 8 depict the data format of the stream start application packet arrival time (S_S_APAT) and the packet arrival time (PAT) of a transport stream packet in accordance with an embodiment of the invention. When the control unit 250 of the streamer 200 records the stream start application packet arrival time (S_S_APAT) contained in the stream object general information (SOB_GI) on the recording medium 230, the stream start application packet arrival time (S_S_APAT) is recorded as 6-byte data as shown in FIG. 7(a) comprising a 9-bit packet arrival time extension (PAT_ext) and a 39-bit packet arrival time base (PAT_base) in accordance with the MPEG format. The stream start application packet arrival time (S_S_APAT) is part of navigation/management data.

Figure 3:
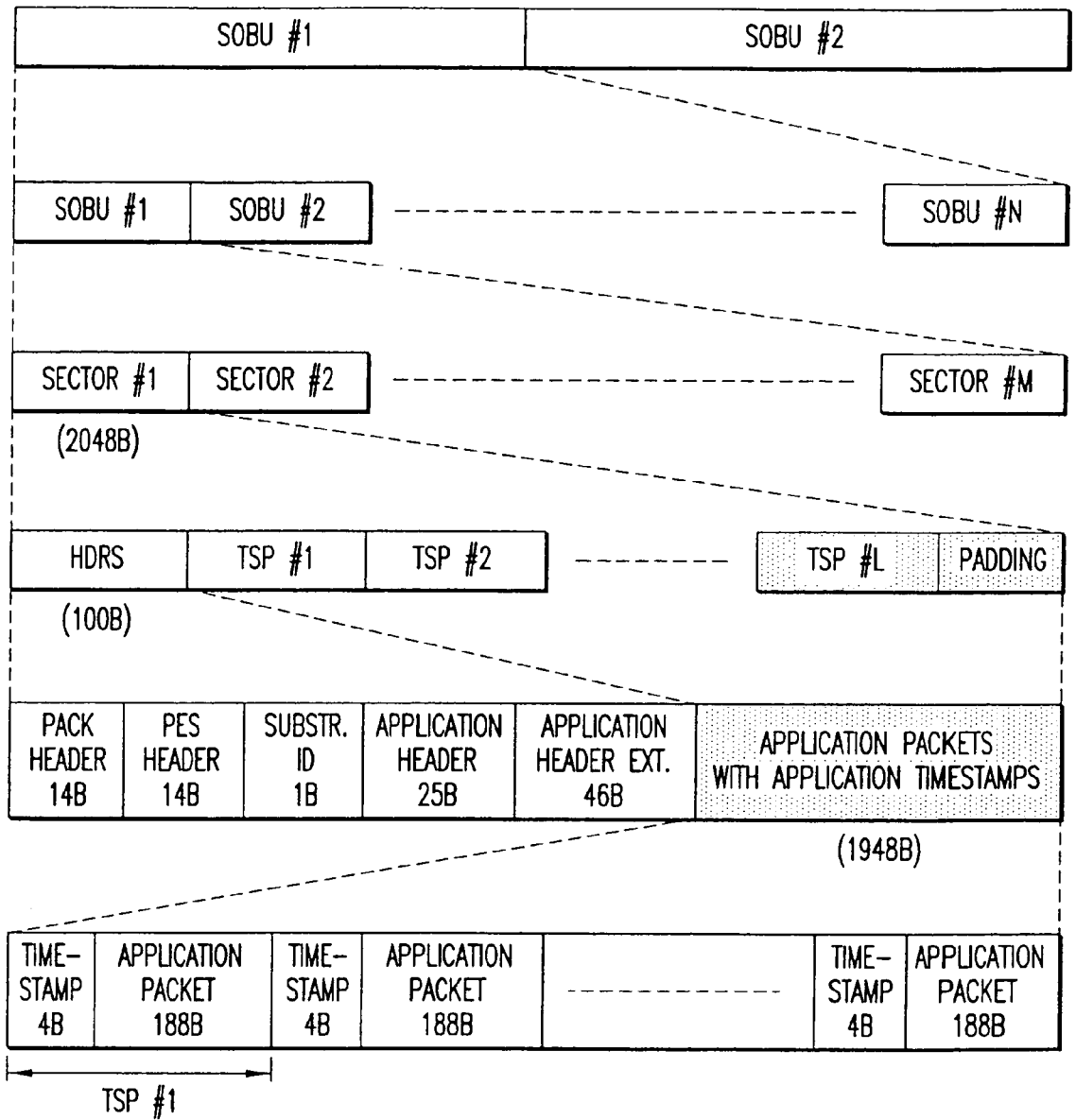
FIG. 3 is a pictorial representation showing the general hierarchical structure of a recorded digital data stream.
Figures 4, 5:
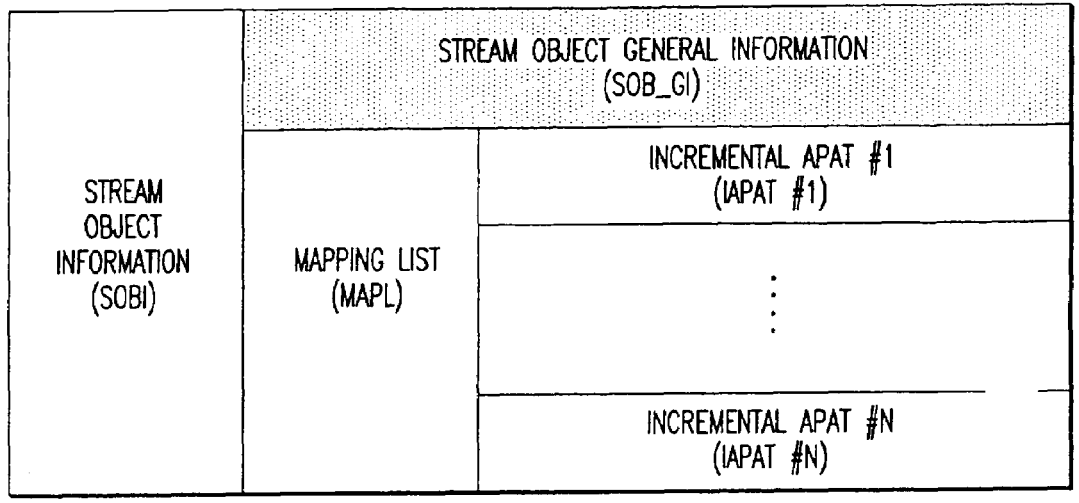
FIG. 4 is a table showing the general navigation information for a recorded data stream.
FIG. 5 is a table detailing a part of the general navigation information of a recorded data stream.
Figure 6A:
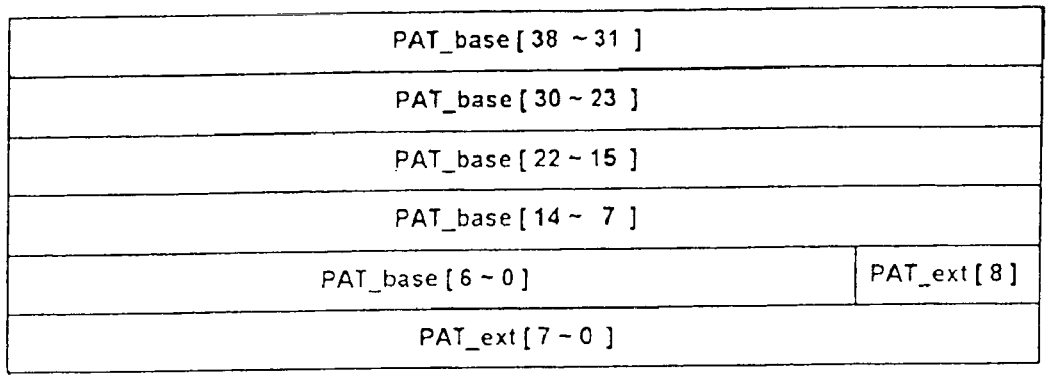
FIG. 6(a) shows 6-byte stream start application packet arrival time (S_S_APAT) contained in a stream object general information (SOB_GI) and FIG. 6(b) shows 4-byte packet arrival time (PAT) which is time stamp recorded with an application packet.
Figure 6B:
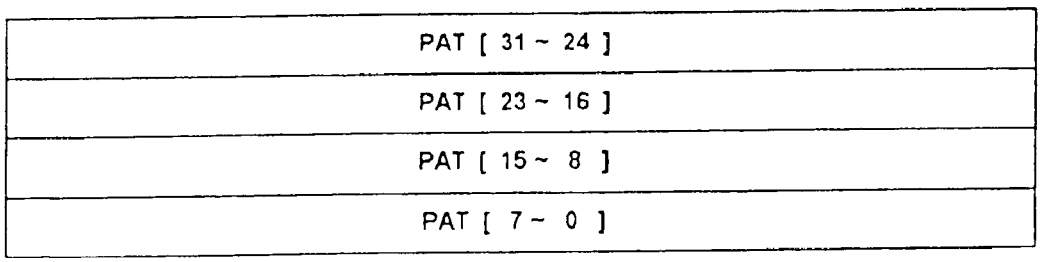

In the stream start application packet arrival time (S_S_APAT), the packet arrival time extension (PAT_ext) is a modulo-300 counter that is incremented at a rate of 27 MHz, whereas the packet arrival time base (PAT_base) is incremented at a rate of 90 kHz. On the other hand, the packet arrival time (PAT) of a transport stream packet received through the communication interface 210 is 4-byte data as shown in FIG. 7(b) comprising a 9-bit packet arrival time extension (PAT_ext) and 23-bit packet arrival time base (PAT_base). Like the stream start application packet arrival time (S_S_APAT) in FIG. 7(a), the packet arrival time extension (PAT_ext) in FIG. 7(b) is a modulo-300 counter that is incremented at a rate of 27 MHz and the packet arrival time base (PAT_base) is incremented at a rate of 90 kHz. The PAT of the transport stream packet shown in FIG. 7(b) is a time stamp recorded along with an application packet, and is part of a SOB as shown in FIG. 3.

In consequence, as shown in FIGS. 7(a) and 7(b), the 4-byte packet arrival time (PAT) of the transport stream packet has the same format as the lower 4 bytes of the 6-byte stream start application packet arrival time (S_S_APAT). Thus, according to the present invention, the lower 4-byte data of a stream start application packet arrival time (S_S_APAT) always coincides with one of the recorded 4-byte packet arrival times (PATs). Also, there is certainly a packet arrival time (PAT) coinciding with the lower 4-byte data of the search time (ST) requested by a user, the 6-byte search time (ST) comprising a packet arrival time base (PAT_base) and a packet arrival time extension (PAT_ext) specified by the MPEG format.

The 4-byte packet arrival time (PAT) of a transport stream packet can represent up to 93.2 s (93.2=223/90 kHz) since its packet arrival time base (PAT_base) is 23-bit data that is incremented at a rate of 90 kHz. The packet arrival time (PAT) is reset to zero whenever the value reaches the limit. The control unit 250 keeps examining occurrence of reset. If reset occurs, the control unit 250 controls the stream recording unit 220 to record information indicative of the occurrence of reset (PAT_carry) in the header information area pertaining to a sector comprising a plurality of transport stream packets (TSPs) and header information, as explained before with reference to FIG. 3.

The reset indication information is used in the case of data search. The reset indication information (PAT_carry) as shown in FIG. 8 may be recorded as 1-bit data in the application header extension area, one of header information contained in the associated sector.

Figure 9:
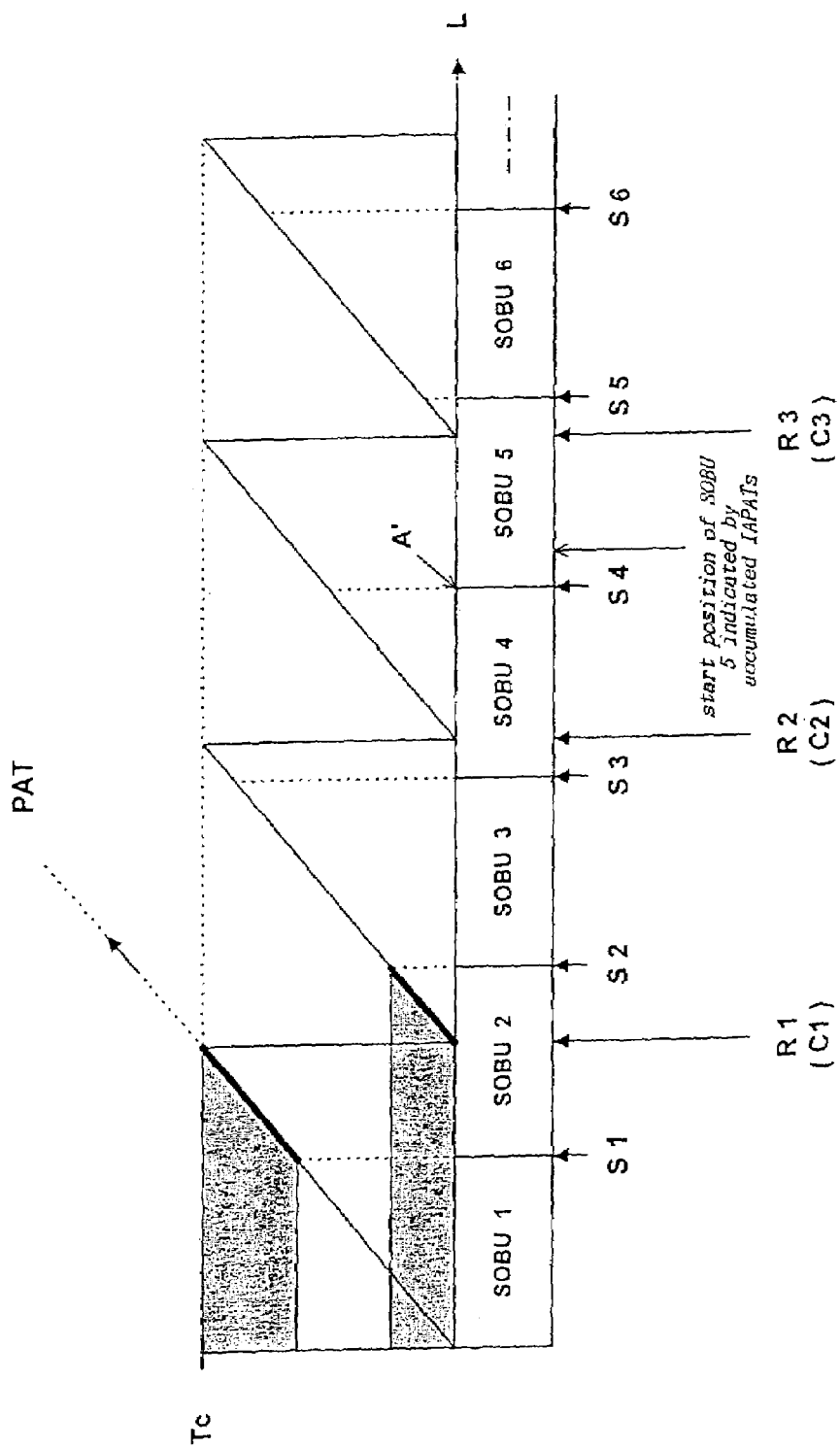
FIG. 9 is a pictorial representation of the relation between a stream object unit and the time information according to an embodiment of the present invention.

FIG. 9 shows the way the packet arrival time (PAT) of each transport stream packet is created when a digital data stream received by the set top box 100 is recorded by the streamer 200. It is assumed that a stream object unit (SOBU) is made up of 32 sectors with each sector having 2048 bytes and the transfer rate of the data stream is not higher than 10 kbps. Hence, the time needed to record a stream object unit (SOBU) is 52.4 s (52.4=32 sectors×2048 byte/10 kbps) and the packet arrival time (PAT) is reset at 93.2 s intervals.

In other words, a stream object unit is created every 52.4 s (S1, S2, . . . ), and the packet arrival time (PAT) is reset every 93.2 s (R1, R2, . . . ) and so the reset indication information (PAT_carry) is also created every 93.2 s (C1, C2, . . . ). As a result, the packet arrival times (PATs) of all transport stream packets belonging to a stream object unit (SOBU) have mutually exclusive values as long as the transfer rate of the digital data stream exceeds 10 kbps.

Figure 2:
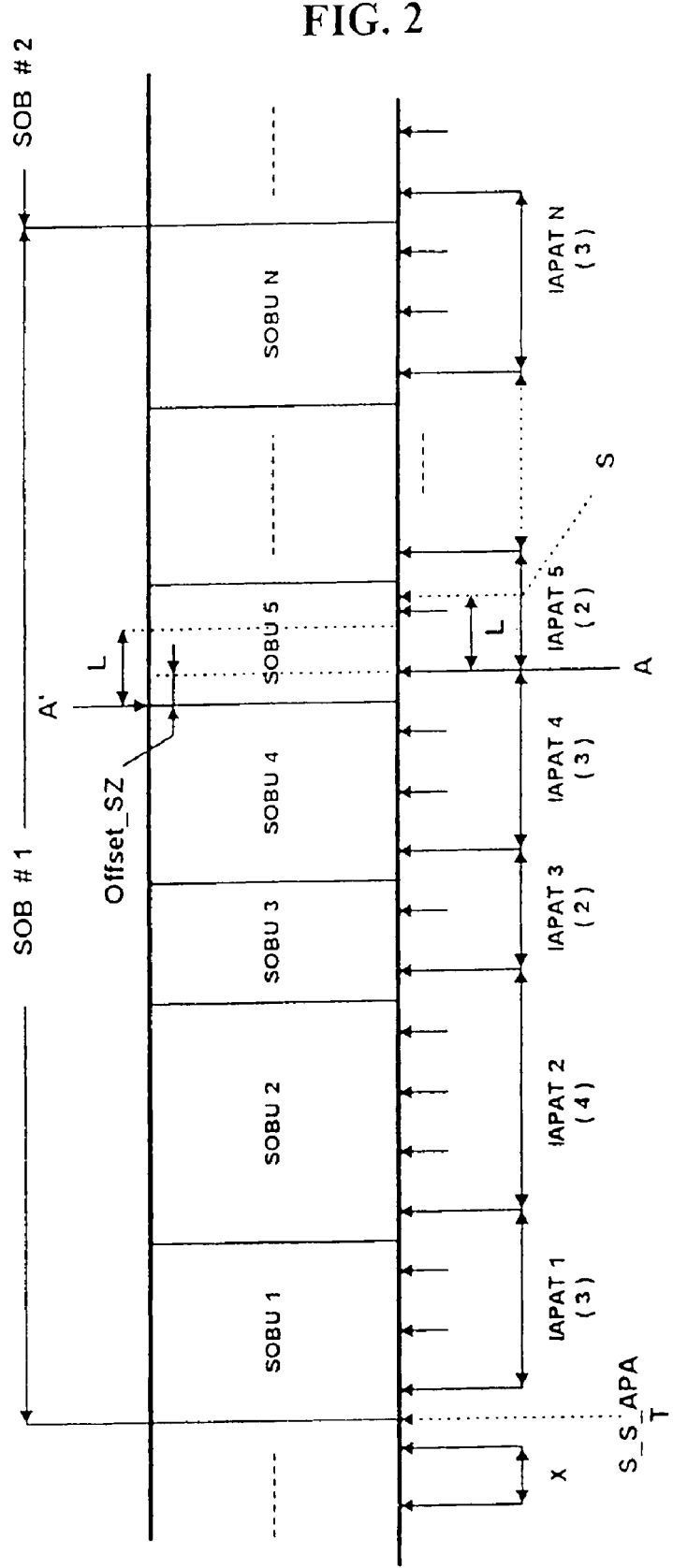
FIG. 2 is a pictorial representation of a general process for creating and recording the navigation information.

The method for searching for the position (s) of a transport stream packet corresponding to the search time (ST) requested by a user from the data stream recorded as shown in FIG. 9 will be explained with reference to FIG. 2. First, the stream start application packet arrival time (S_S_APAT) contained in the stream object general information (SOB_GI) of each stream object (SOB) is compared with the requested search time (ST) and a stream start application packet arrival time (S_S_APAT) that is closest to but does not exceed the request search time (ST) is detected. Referring to the mapping list (MAPL) of the stream object SOB #1 containing the detected stream start application packet arrival time (S_S_APAT), the incremental application packet arrival time (IAPAT 1~4) contained in the mapping list (MAPL) are summed up. The sum value is multiplied by the unit time (x) and added to the stream start application packet arrival time (S_S_APAT). The procedure is repeated until the calculated value (S_S_APAT+x(ΣIAPAT)) approaches the requested search time (ST) without exceeding it. In FIG. 2, the summation and multiplication is repeated to include IAPAT 4 because the calculated value (S_S_APAT+x(ΣIAPAT)) exceeds the search time (ST) if the calculation continues to IAPAT 5. The stream object corresponding to the calculated value is SOBU 5, which corresponds to the upper 2-byte data of the search time (ST) requested by the user.

From the start position A' of the searched stream object SOBU 5, the 4-byte packet arrival time (PAT) of each transport stream packet is detected. The detected packet arrival time (PAT) is compared with the lower 2-byte data of the search time (ST) requested by the user to find the transport stream packet (TS) the packet arrival time (PAT) of which coincides with the lower 2-byte data of the search time (ST).

In summary, using the stream start application packet arrival time (S_S_APAT) and incremental application packet arrival time (IAPAT) contained in the mapping list, the stream object unit SOBU5 corresponding to the upper-unit time data of the requested search time (ST) is detected and then a transport stream packet the packet arrival time of which coincides with the lower-unit time data of the search time (ST) is detected. As a result, the position of the detected transport stream packet coincides with the requested search time (ST).

In this case, however, if the 4-byte packet arrival time added to each transport stream packet overflows after the start of the associated stream object unit (SOBU) and before certain unit time elapses, the actual packet arrival time may become different from the arrival time of the first transport stream packet calculated based on the incremental application packet arrival time in the mapping list. This case will be explained in detail with reference to FIG. 10.

Figure 10:
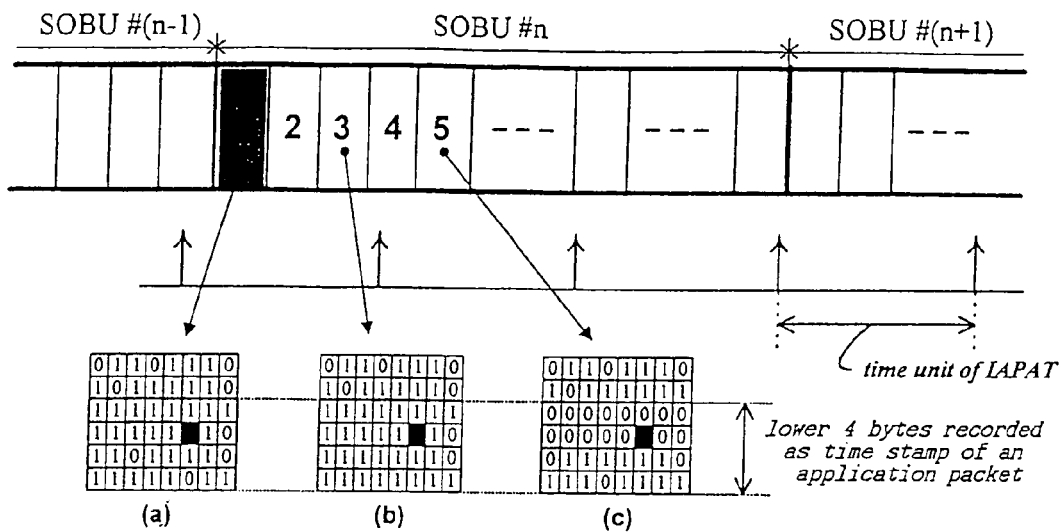
FIG. 10 is a pictorial representation of the packet arrival time of transport stream packets recorded as 4-byte data.

FIG. 10 depicts an example where the packet arrival time of each transport stream packet being received is recorded as 4-byte data. In this case, it is assumed that the unit time of the incremental application packet arrival time (IAPAT) corresponds to the bit3 of the 4th byte of the packet arrival time (the bit shaded in FIG. 10). Therefore, whenever the unit time elapses, the bit3 of the 4th byte is toggled.

In FIG. 10, the packet arrival time reference information ((a) in FIG. 10) of the first transport stream packet of the nth stream object unit (SOBU #n) is FFFEDEFB$_{(16)}$ and the packet arrival time reference information ((b) in FIG. 10) of the third transport stream packet is FFFFFEFF$_{(16)}$. Because the unit time elapses after the third transport stream packet arrives, the lower 4 bytes of the 6 bytes indicative of the packet arrival time are reset after the third transport stream packet arrives and before the unit time elapses and a carry is propagated to the upper 2 bytes. Accordingly, the fifth transport stream packet, for example, has the arrival time reference information of 00007EEFh, which is less than the previous value.

The upper 2 bytes of the actual packet arrival time of the first transport stream packet are 6EBE$_{(16)}$ but the value is not recorded on the recording medium. In the case of data search, therefore, the upper 2 bytes are calculated based on the incremental application packet arrival time (IAPAT) information. However, because a carry already exists before the first time duration of the unit time of the incremental application packet arrival time (IAPAT) elapses within the associated stream object unit (SOBU), the value of the upper 2 bytes obtained based on the incremental application packet arrival time (IAPAT) information is greater than that of the upper 2 bytes of the actual packet arrival time by 1. For this reason, in the case of data search, the upper 2 bytes calculated base on the incremental application packet arrival time (IAPAT) information should be not regarded as the upper 2 bytes prefixed to the 4-byte arrival time reference information detected from the transport stream packet.

Figure 11:
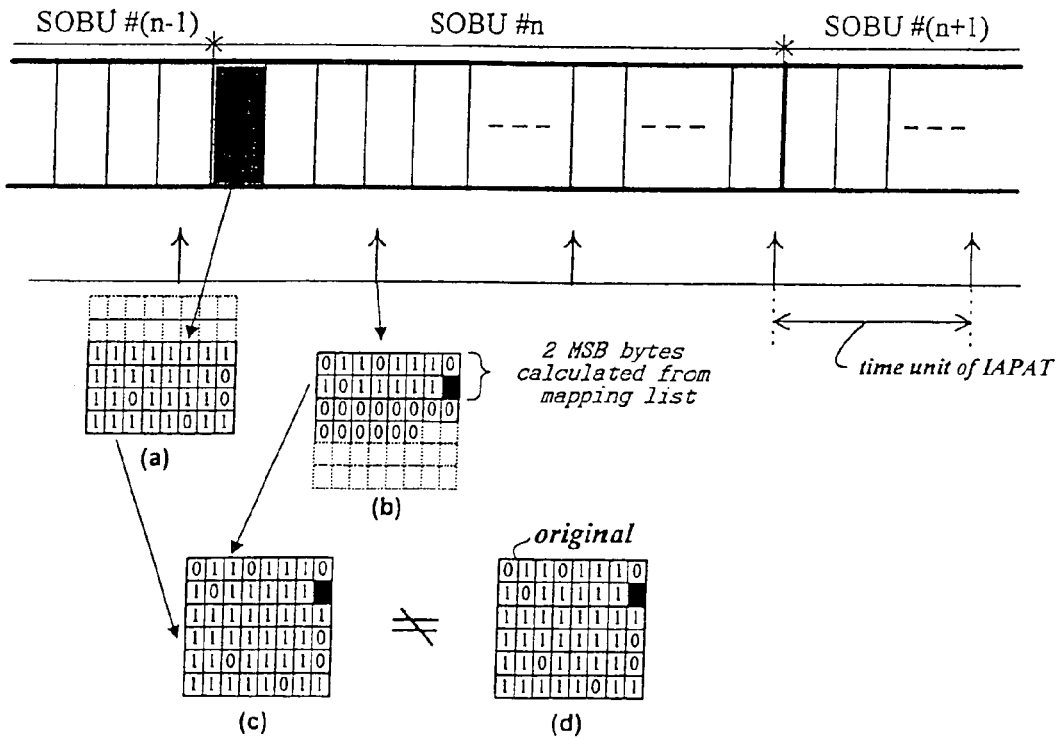
FIG. 11 is a pictorial representation showing the case where the arrival time information obtained in FIG. 10 differs from the actual packet arrival time.

FIG. 11 depicts the case where a carry is generated as explained before. It is shown that the actual packet arrival time ((d) in FIG. 11) differs from the 6-byte packet arrival time ((c) in FIG. 11) comprising the upper 2 bytes ((b) in FIG. 11) calculated based on the incremental application packet arrival time (IAPAT) information and the 4 byte arrival time reference information ((a) in FIG. 11) detected from the first transport stream packet.

In FIG. 11, the time information corresponding to a stream object unit (SOBU) calculated based on the incremental application packet arrival time (IAPAT) information is expressed by the upper 3 bytes and upper 6 bits of the forth byte. This is because the unit time of the incremental application packet arrival time (IAPAT) does not have time resolution lower than 218 bits.

In order to compensate for the error in the calculated packet arrival time, therefore, it is inevitable to check whether the 4-byte packet arrival time reference information generated a carry after the first packet of an arbitrary stream object unit (SOBU) arrives and before the unit time of the incremental application packet arrival time (IAPAT) elapses.

To this end, the control unit 250 compares the lower 14 bits of the 30-bit time information calculated based on the incremental application packet arrival time (IAPAT) information with the upper 14 bits of the 4-byte arrival time reference information of the first transport stream packet of the current stream object unit (SOBU) and concludes that a carry is generated if the latter is greater than the former. If so, the control unit 250 subtracts the least significant bit of the upper 2-bytes from the 30 bits calculated based on the incremental application packet arrival time (IAPAT) information, takes the 2-byte result as the upper 2 bytes of the packet arrival time of the first transport stream packet of the associated stream object unit, and compares the packet arrival time with the requested search time.

In the example shown in FIG. 11, the number $11011110111110_{(2)}$ is greater than the number $00000000000000_{(2)}$ and thus the upper 2 bytes of the arrival time of the first transport stream packet is obtained by subtracting $000100000000_{(16)}$ from $6EBFXXXXXXXX_{(16)}$ and taking the upper 2 bytes from the result. As a result, the time information comprising the 2-byte data and the 4-byte packet arrival time detected from the transport stream packet is used in the case of data search.

The existence of carry may be checked in a different manner. For example, the control unit 250 retrieves all data of the sectors constituting the associated stream object unit and checks the reset indication information (PAT_carry) recorded in the header information in each sector. If any of the reset indication information indicates carry, the packet arrival time can be corrected by the aforementioned method. Otherwise, the upper 2 bytes of the value calculated based on the incremental application packet arrival time information can be used as the upper 2 bytes of the packet arrival time.

As one skilled in the art would readily recognize, the recording medium 230 can be, e.g., a DVD.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording time information associated with digital data, the method comprising the steps of:
 (a) recording first time information on a recording medium, the first time information being part of management data for managing presentation data; and
 (b) recording second time information on the recording medium, the second time information being time information of the presentation data,
 wherein a format of the first time information coincides with a format of the second time information, and the format of each time information includes a base part and an extension part, the base part having a value created by a smaller time unit and extension part having a value created by a bigger time unit.

2. The method according to claim 1, wherein the presentation data include video data.

3. The method according to claim 2, wherein each of the first and second time information is represented in the format of the extension part of packet arrival time extension and the base part of packet arrival time base.

4. The method according to claim 3, wherein the packet arrival time extension is incremented at a rate of 27 MHz, and the packet arrival time base is incremented at a rate of 90 kHz.

5. The method according to claim 2, wherein in the step (b), the presentation data are represented in data object units, and the second time information is time information for each of the data object units.

6. The method according to claim 5, wherein the data object units are grouped into data objects, and in the step (a), the first time information is time information for each of the data objects.

7. The method according to claim 1, wherein the step (a) includes generating the first time information to be recorded on the recording medium, and the step (b) includes generating the second time information to be recorded on the recording medium.

8. The method according to claim 1, wherein in the steps (a) and (b), the recording medium is a DVD.

9. An apparatus for recording time information associated with digital data, the apparatus comprising:
 a recording unit recording first time information and second time information on a recording medium, the first time information being part of management data for managing presentation data, the second time information being time information of the presentation data,
 wherein a format of the first time information coincides with a format of the second time information, and the format of each time information includes a base part and an extension part, the base part having a value created by a smaller time unit and extension part having a value created by a bigger time unit.

10. The apparatus according to claim 9, wherein the presentation data include video data.

11. The apparatus according to claim 10, wherein each of the first and second time information is represented in the format of the extension part of packet arrival time extension and the base part of packet arrival time base.

12. The apparatus according to claim 11, wherein the packet arrival time extension is incremented at a rate of 27 MHz, and the packet arrival time base is incremented at a rate of 90 kHz.

13. The apparatus according to claim 10, wherein the presentation data are represented in data object units, and the second time information is time information for each of the data object units.

14. The apparatus according to claim 13, wherein the data object units are grouped into data objects, and the first time information is time information for each of the data objects.

15. The apparatus according to claim 9, further comprising:
 a generating unit generating the first time information to be recorded on the recording medium; and generating the second time information to be recorded on the recording medium.

16. The apparatus according to claim 9, wherein the recording medium is a DVD.

17. A recording medium for recording time information associated with digital data, the recording medium comprising:
 a recording layer;
 first time information stored on the recording layer, the first time information being part of management data for managing presentation data; and
 second time information stored on the recording layer, the second time information being time information of the presentation data, wherein a format of the first time information coincides with a format of the second time information, and the format of each time information includes a base part and an extension part, the base part having a value created by a smaller time unit and extension part having a value created by a bigger time unit.

18. The recording medium according to claim 17, wherein the presentation data include video data.

19. The recording medium according to claim 18, wherein each of the first and second time information is represented in the format of the extension part of packet arrival time extension and the base part of packet arrival time base.

20. The recording medium according to claim 19, wherein the packet arrival time extension is incremented at a rate of 27 MHz, and the packet arrival time base is incremented at a rate of 90 kHz.

21. The recording medium according to claim 18, wherein the presentation data are represented in data object units, and the second time information is time information for each of the data object units.

22. The recording medium according to claim 21, wherein the data object units are grouped into data objects, and the first time information is time information for each of the data objects.

23. The recording medium according to claim 17, wherein the recording medium is a DVD.

24. The recording medium according to claim 22, wherein the first time information indicates a presentation start time of each data object.

25. The recording medium according to claim 17, wherein the base part has a 90 kHz unit value and the extension part has a 27 MHz unit value.

26. The method according to claim 6, wherein the first time information indicates a presentation start time of each data object.

27. The method according to claim 1, wherein the base part has a 90 kHz unit value and the extension part has a 27 MHz unit value.

28. The apparatus according to claim 14, wherein the first time information indicates a presentation start time of each data object.

29. The apparatus according to claim 9, wherein the base part has a 90 kHz unit value and the extension part has a 27 MHz unit value.

* * * * *